United States Patent
Kuhn et al.

[15] 3,703,952
[45] Nov. 28, 1972

[54] SELF METERING FEEDER CONVEYOR

[72] Inventors: Kenneth G. Kuhn, Danville; Neal C. Chamberlain, Hoopeston, both of Ill.

[73] Assignee: FMC Corporation, San Jose, Calif.

[22] Filed: Aug. 10, 1971

[21] Appl. No.: 170,543

[52] U.S. Cl. .................. 198/102, 198/185, 209/116
[51] Int. Cl. ............................................. B65g 37/00
[58] Field of Search .......... 198/20, 102, 185, 31 AA; 209/90, 91, 116

[56] References Cited

UNITED STATES PATENTS 3,191,747   6/1965   Pollard .................. 198/185 X
3,386,560   6/1968   Ross ...................... 198/31 AA Primary Examiner—Richard A. Schacher
Attorney—F. W. Anderson et al.

[57] ABSTRACT

A self metering conveyor feeding system supplies one or more corn processing machines with husked ears of corn. The system comprises a main conveyor belt and a narrow diverter belt running flat across the main belt for advancing ears of corn across the main belt and through an adjustable gate to feed rolls, the latter transferring the ears to the flights of a take away conveyor. A reserve supply of ears of corn is maintained at the feed roll, and when the reserve is filled, the main conveyor merely advances the excess ears past the gate and on to a downstream diverter system, if such is provided.

7 Claims, 5 Drawing Figures

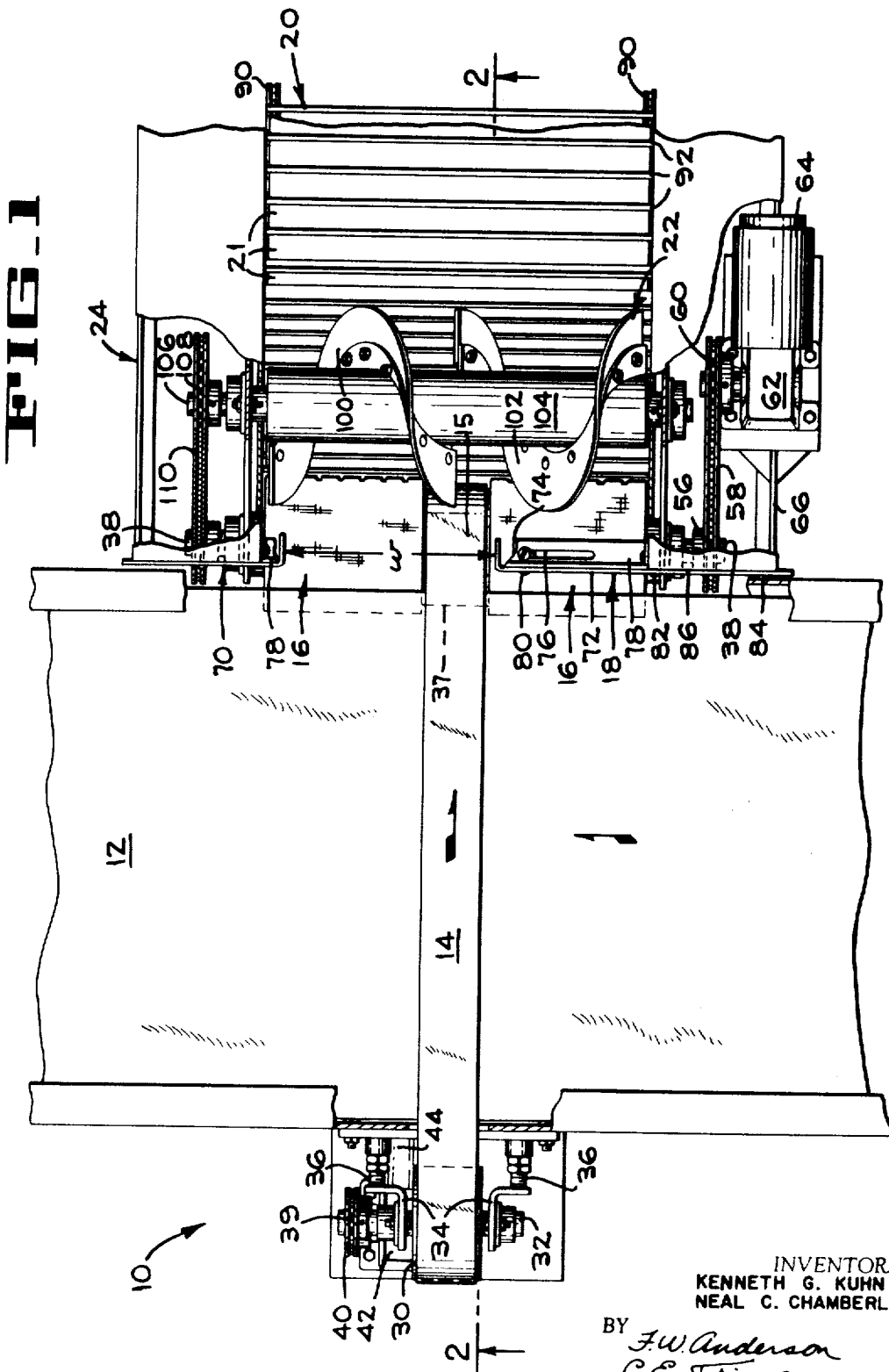

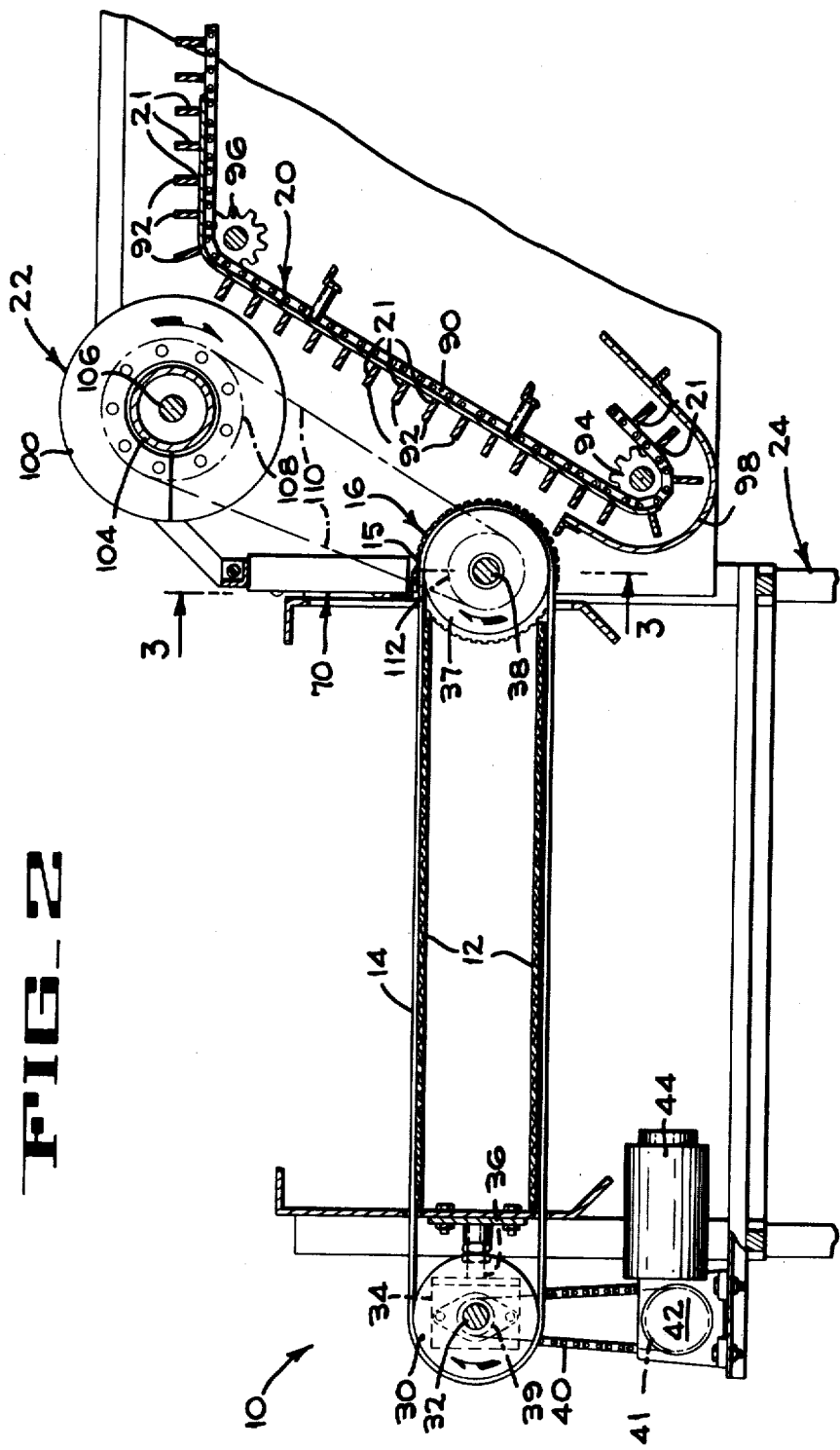

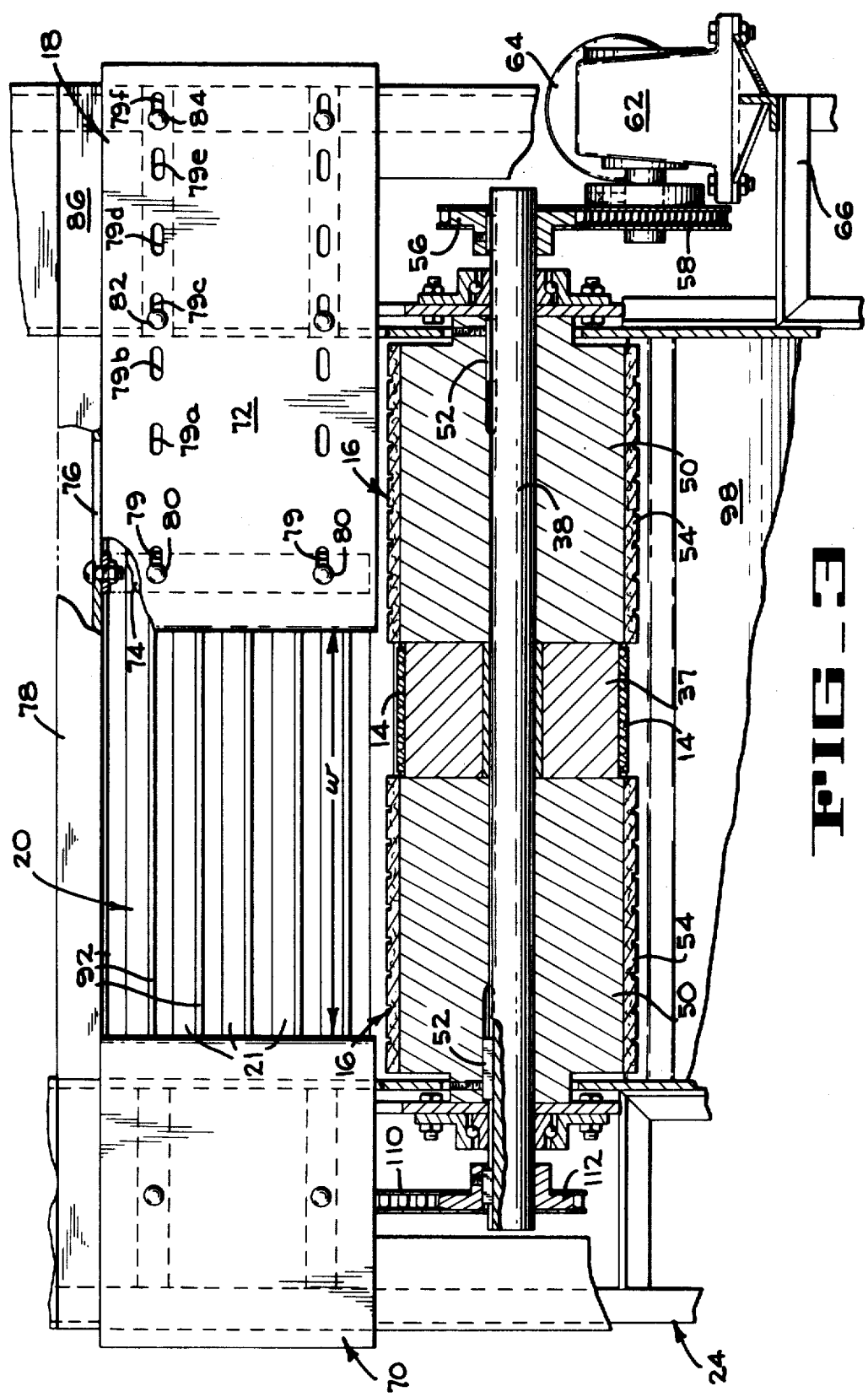
FIG_3

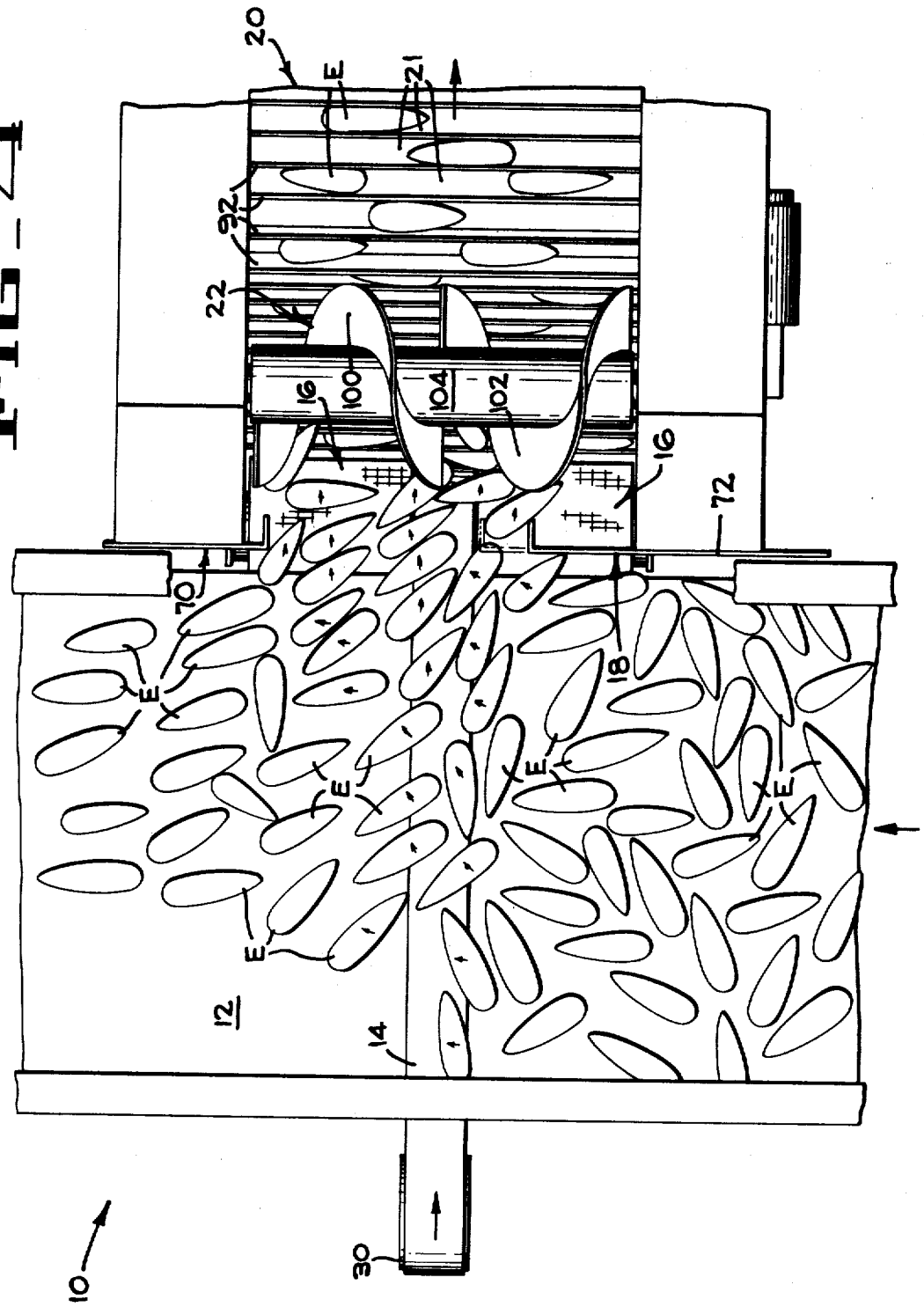

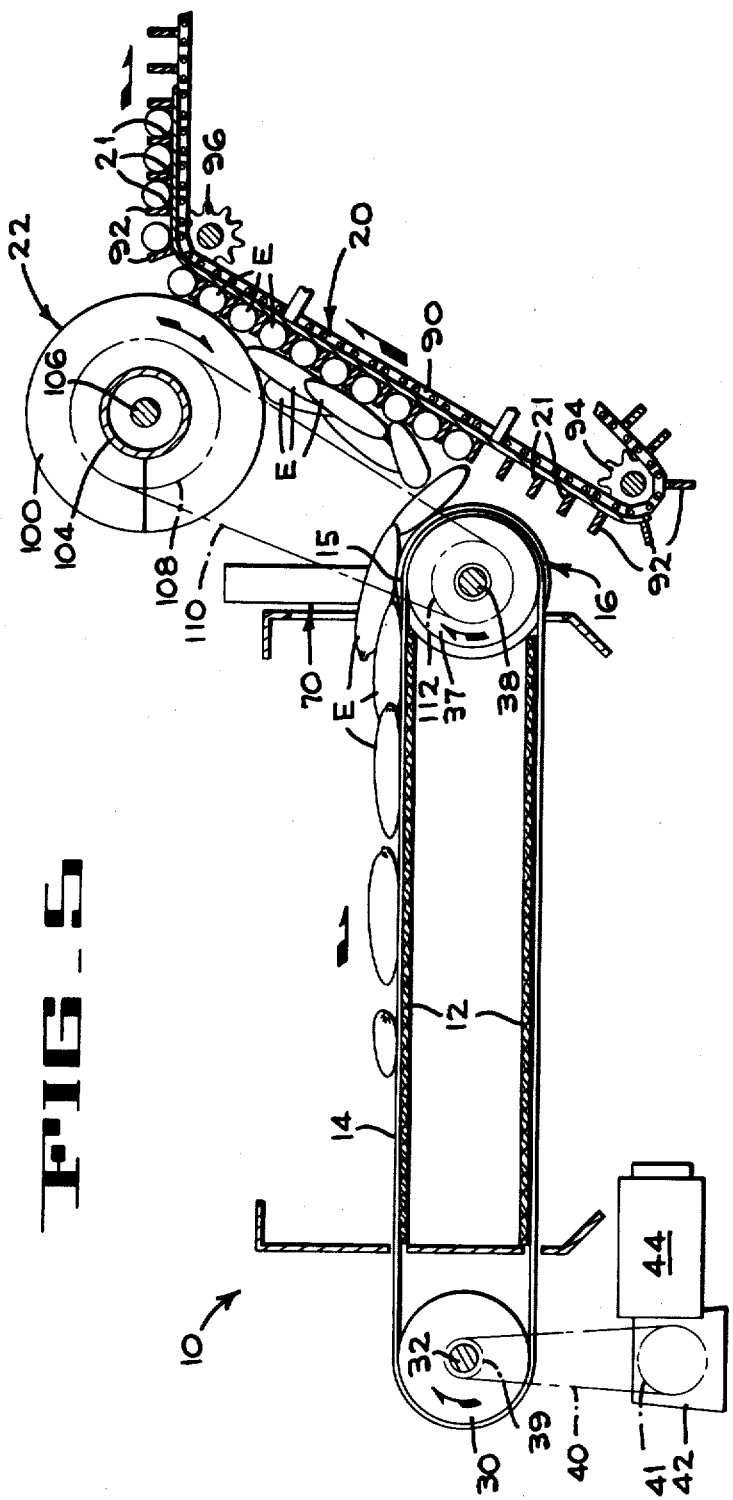

SELF METERING FEEDER CONVEYOR

CROSS REFERENCE TO RELATED APPLICATIONS

The helical brushback roller shown herein forms the subject matter of a copending United States application of Sears et al., Ser. No. 170,536, filed Aug. 10, 1971 and assigned to the FMC Corporation.

FIELD OF THE INVENTION

This invention relates to material handling and more particularly to a diverter conveyor that forms a reserve discharge supply of material (such as ears of corn) to one side of the main conveyor without substantially impeding the flow of material along that conveyor.

DESCRIPTION OF PRIOR ART

The U.S. Pat. to Connley et al. No. 465,463, Dec. 22, 1891 shows a diverter for bricks comprising a laterally running vertical deflecting belt disposed above the main conveyor.

The U.S. Pat. to Campbell et al. No. 1,256,294, filed Feb. 12, 1918 is typical of a number of patents showing conventional pivotal type deflector gates disposed across a main conveyor.

The U.S. Pat. to Moores No. 1,479,866, Jan. 8, 1924, shows a U-shaped conveyor for loaves of bread formed by interlaced narrow belts crossed at 90°.

The U.S. Pat. to Parker No. 1,549,499, Aug. 11, 1925 shows a diverting mechanism in the form of rotating discs which can be raised and lowered above the rollers of the main conveyor to transfer articles to the side of the latter.

The U.S. Pat. to Gentil No. 1,889,065, Nov. 29, 1932 shows a plurality of driven transfer wheels for diverting articles from a main conveyor to a cross conveyor.

The U.S. Pat. to Parisi No. 2,530,074, Nov. 14, 1950 has a diverter belt distribution system for sand carried on a main belt, the diverter comprising adjustable height baffles in front of screw type diverter augers.

The U.S. Pat. to Henry No. 2,758,728, Aug. 14, 1956 shows an indexed sweep conveyor having paddles that cross the main belt and deposit bags of potato chips into a bin. The sweep conveyor is stopped in a position so that the bags traveling along the main conveyor will not be interfered with by the sweep paddles.

SUMMARY OF THE INVENTION

The conveyor system of the present invention will be described as applying to a system for supplying husked ears of corn to one or more corn cutters disposed at the side of a main conveyor. The main conveyor has a side wall which is provided with an adjustable gate for delivery of corn to a cleated take away conveyor running from the gate. Ears of corn are diverted from the main conveyor through the gate by a narrow diverter belt that runs flat across the conveying surface of the main conveyor. As the mass of ears is advanced along the main conveyor, and carried over the diverter belt, the diverter belt urges the ears laterally through the gate into a reserve supply area behind the gate for pickup by a flighted take away conveyor. Feed rolls flank the diverter belt delivery pulley for advancing ears in the reserve onto the take away conveyor. When the reserve supply area is filled with ears, the diverting action of the diverter belt becomes ineffective, and now the ears are merely swept across the diverter belt to downstream locations, which may include one or more diverting systems of the type just described. This system facilitates maintaining the flights of the take away conveyor that lead to a corn cutter fully supplied with ears of corn so that the cutter operates at capacity.

DETAILED DESCRIPTION OF THE DRAWINGS

FIG. 1 is a plan view of a diverter system embodying the invention.

FIG. 2 is a central longitudinal section taken on line 2—2 of FIG. 1.

FIG. 3 is an enlarged section taken on line 3—3 of FIG. 2.

FIG. 4 is a simplified diagram in plan showing the mode of operation of the system.

FIG. 5 is a simplified view like that of FIG. 2, also illustrating the mode of operation of the system.

DETAILED DESCRIPTION

The major elements of a system 10 of the present invention (FIG. 1) include a wide, horizontally running main conveyor belt 12, which belt is preferably an endless belt having the usual drive and idler pulleys at each end, now shown in the drawings. Running transversely of the main belt 12 is a narrow, low profile diverter belt 14. The delivery end 15 of the diverter belt 14 is flanked by feed rollers 16 and an adjustable gate indicated generally at 18 provides a delivery port having a width "w" for admitting the ears of corn (see also FIG. 4) to the feed rollers 16 from the main belt 12. The ears of corn are delivered by the feed rollers 16 to an ascending reach of a cleated take away conveyor indicated generally at 20 having transverse pockets 21. A double helix brush back roller, indicated generally at 22, is disposed above the conveyor 20. The brush back roller levels the mass of ears deposited on the take away conveyor 20, disposes misplaced ears lengthwise in the pockets 21 of that conveyor, and gently lays down upstanding ears. The configuration of the helical brush back roller 22 illustrated herein forms the subject matter of the aforesaid copending United States application of Sears et al.

The conveyor apparatus shown in the drawings is supported on framework illustrated generally at 24, the structural details of which are not critical to the invention. The thin diverter belt 14, which runs flat across the main belt 12, is trained around a drive pulley 30 mounted on a shaft 32 that runs in bearings supported in spaced brackets 34 (FIG. 1). The brackets 34 are mounted on the frame 24 by means of adjustable posts 36, providing for tensioning of the diverter belt 14. The delivery end 15 of the diverter belt 14 is trained around an idler pulley 37 loosely mounted on a shaft 38, best seen in FIG. 3. The drive pulley 30 for the diverter belt has a drive sprocket 39 on the shaft 32 and (FIG. 1) driven by a chain 40 (FIG. 2) and a sprocket 41 for that chain is on the shaft of a gearbox 42. The gear box is connected to an electric motor 44. Thus, the speed of the diverter belt 14 is independent of the speed of the other elements of the system.

The feed rollers 16 are mounted on the same shaft 38 that mounts the delivery idler pulley 37 for the diverter belt, as best seen in FIG. 3. The feed rollers have large hubs 50, keyed to the shaft 38 at 52, and covered with ribbed or corrugated rubber covers 54 to increase their frictional action against the ears of corn running through the machine. The rollers 16 have a diameter that slightly exceeds that of the diverter belt 14 at the pulley 37. The shaft 38, and hence the feed rollers 16, are rotated to provide a peripheral speed somewhat higher than that of the diverter belt 14. In the embodiment shown, this result is obtained by driving the shaft 38 independently of the diverter belt 14. Thus, as seen in FIGS. 1 and 3, a drive sprocket 56 is keyed to one end of the shaft 38 and a chain 58 is trained around that sprocket and a sprocket 60 driven by gear box 62 and an associated electric motor 64. The motor and gear box assembly are mounted on a sub frame 66 supported from the main frame 24 in any suitable manner, the details of which are not critical to the present invention.

The adjustable gate 18 (FIGS. 1 and 3) cooperates with a fixed side plate member 70 mounted on the main frame 24 to provide the opening "w" for the admission of ears of corn to feed rolls 16 and on to the take away conveyor 20. In the preferred construction, the fixed side plate 70 is placed downstream from the diverter belt 14 by a distance somewhat less than half the width of the take away conveyor 20. The diverting action of the diverter belt 14 and the feeding action of the feed rolls 16 are adjusted in accordance with the capacity of the take away conveyor 20 by making the gate 18 adjustable to control the horizontal width "w" (FIG. 3). In the preferred construction illustrated, the adjustable gate 18 comprises a plate 72, one end of which is supported on a bracket 74 that can be adjustably mounted along a slot 76 formed in a cross bar 78 of the frame work. The plate 72 is mounted on the bracket 74 by elongate slots 79 and carriage bolt clamp assemblies 80. Additional slots 79a – 79f and carriage bolt clamp bolt assemblies 82, 84 mount the plate 72 on a vertical frame plate 86. As seen in FIG. 3 the slots 79a, etc. are spaced along the plate 72 at various distances. With this construction, fine adjustments of the gate plate 72 can be provided by means of the slot and clamp bolt constructions. Coarser adjustments of the gate opening can be made by positioning the clamp bolt 75 for the bracket 74 along the slot 76 and selecting newly aligned slots 79a, etc., in the plate 72 for matching with the bolts 82, 84 previously described.

The take away conveyor 20 is provided to carry ears which are laying horizontally in the pockets 21 up and away from the distributing conveyor system of the present invention and deliver them to a corn cutter or the like to one side thereof and not illustrated in the drawings. Apparatus which receives ears oriented in the cleats of a conveyor and presents them to cutting and orienting devices is shown, for example, in the U.S. Patent to Ross et al. No. 3,394,805, July 30, 1968, although the utility of the present invention is not limited to use of the patented apparatus.

The take away conveyor 20, the mounting and drive details of which are not critical to the present invention, includes a pair of side chains 90 having special links that mount transversely extending cleats 92 to form the pockets 21. The cleats 92 are spaced longitudinally of the conveyor by a distance sufficient to provide pockets 21 large enough to receive larger ears of corn, but preferably the cleats are not spaced enough to receive two normally developed ears. The chains 90 for the take away conveyor 20 are trained over sprockets 94, 96 as seen in FIG. 2, and are driven by the machine in which they are associated in a manner not critical to the present invention and hence not illustrated.

As seen in FIG 2, a guard plate 98 surrounds the lower loop of the take away conveyor in order to prevent ears of corn that tumble down from the delivery rolls 16 from getting caught in lower parts of the machine or from falling out of the machine.

The brush back roller 22 illustrated forms the subject matter of the aforesaid copending United States application of Sears et al. This roller has oppositely directed flexible helical flights 100, 102 of opposite hand or lead and disposed so that their rotation urges ears from the outside of the conveyor 20 towards its midplane. The hub 104 of the brush back roller is mounted on a shaft 106, supported in the framework for the take away conveyor. The shaft 106 mounts a sprocket 108 (FIG. 1) which is driven by a chain 110 and a drive sprocket 112 (FIG. 2) keyed to the roller shaft 38 previously described. The brush back roller 22 is rotated so that the portion thereof adjacent the ascending flight of the take away conveyor 20 moves in a direction opposite to that of the conveyor cleats 92.

In a typical installation for handling ears of corn, the main belt 12 will be about 20 – 30 inches wide and will run at about 120 feet per minute. The diverter belt 14 will be about 2.0 inches wide, five thirty-seconds inches thick and will be run at about 120 feet per minute. The feed rollers 16 have a diameter of about 7 ⅝ inches and turn at about 88 RPM, giving a peripheral speed of the feed rollers 16 of about 175 feet per minute. The speed of the take away conveyor 20 will be about 39 feet per minute. The width "w" of the gate (FIG. 3) will vary from about 11 inches to 20 inches and the brush back roller 22 will be about 11 ¼ inches in diameter and run at about 122 RPM.

OPERATION

The operation of the diverter of the present invention, when conveying ears of corn E to the take away conveyor 20, for delivery to a corn processing machine or the like, is illustrated diagrammatically in FIGS. 4 and 5. Generally, the main conveyor belt 12 will supply more than one machine, although a diverter for only one machine is illustrated in the drawings. Thus, a mass of ears E will be transported by the main belt 12 which is usually greater than accommodated by any given take away conveyor 20. As the ears E approach the diverter belt 14 they are pushed onto the surface of that belt and hence are urged laterally (to the right in FIG. 4), towards the gate opening "w." The ears that are partially on the diverter belt 14 and partially on the main belt 12 and are urged generally in the direction of the gate. The resultant lateral and longitudinal frictional forces on the ears (indicated by small arrows) brings them through the gate opening "w" and into contact with the faster running feed rolls 16, and the latter remove the ears from reserve supply thus formed and carry them to the cleats 92 on the take away conveyor 20.

It will be noted in FIG. 3 that the feed roll 16 has a diameter slightly greater than that of the diverter belt 14 and its delivery end 15, so that the feed rolls also tend to remove the ears from the diverter belt. With this action a reserve supply of ears is developed above the feed rolls, between the gate and the take away conveyor so that the cleats 92 of the latter conveyor always have available a supply of ears to be picked up and distributed to the machine which the take away conveyor serves.

Those ears which are not pushed through the gate by the feed roll 16 are swept along by the main belt 12 down to the next machine or to a receptacle at the end of that belt for return to the system. The purpose of the gate 18 is to assure a substantial uniform optimum loading of the pockets 21 formed by cleats 92 of the take away conveyor. When the plate 72 of the gate is disposed at the associated edge of the diverter belt 14, as shown in FIGS. 1 and 3, the width "w" of the gate opening is at a minimum. If the relative speeds of the various conveyors is such that this opening does not maintain an adequate reserve supply of the ears at the rollers 16, then the plate 72 of the gate is adjusted by the means previously described to increase the width "w" of the gate opening. A wider opening than that of FIG. 1 is illustrated in the diagram of FIG. 4, wherein the plate 72 is spaced somewhat upstream from the associated edge of the diverter belt 12. The reserve group of ears between the side of the main belt 12 and the take away conveyor 20 can be maintained so that most of the cleat pockets 21 of the latter conveyor are filled with two or more ears of corn E. Generally there will be more ears supplied to the gate than can be removed therefrom, and the excess ears are merely carried on downstream to the next gate by the main belt 12.

As mentioned, the adjustable gate plate 72 is shown in its most restrictive position in FIGS. 1 and 3, that is, it is adjacent the associated edge of the diverter belt 14. If, under given operating conditions, an inadequate supply of ears is being forwarded by the feed roller 16, the gate plate 72 can be adjusted to a more open position such as that illustrated in FIG. 4. Experience has shown that the adjustment of the gate plate 72 under given conditions is rather sensitive and represents an unexpectedly precise means of controlling the operation of the system. The result of the present system is that the combination of the diverter belt, the adjustable gate, the high speed feed rolls and the cleated take away conveyor all cooperate to insure optimum utilization of the take away conveyor 20, despite variations in the rate in which the articles such as ears of corn are presented to the system by the main belt 12. Generally, the main belt 12 can present more ears than can be accommodated by the diverter system and hence the reserve area above the feed rolls 16 will always be substantially full.

Once the ears have been picked up by the cleats 92 of the conveyor 20, they fall between the cleats 92 in the desired lateral disposition in pockets 21. The brush back roller 22, as described in the aforesaid United States copending application, facilitates this orderly orientation of the ears in the take away conveyor 20.

Although the best mode contemplated for carrying out the present invention has been herein shown and described, it will be apparent that modification and variation may be made without departing from what is regarded to be the subject matter of the invention.

What we claim is:

1. A self metering feeder conveyor system comprising a main conveyor belt, a narrow low profile diverter belt running flat across the conveying surface of said main belt, a take away conveyor at the side of said main belt at the delivery end of said diverter belt, a retainer wall running along said side of the main belt and means forming a gate in said retainer wall at said diverter belt for releasing articles that are urged across the main belt by said diverter belt, the thickness of said diverter belt being the sole obstruction to the advance of articles by said main belt.

2. A self metering feeder conveyor system for discrete articles comprising a main conveyor belt, a narrow low profile diverter belt running flat across conveying surface to said main belt, a pulley for the delivery end of said diverter belt at one side of said main belt, feed rolls flanking said diverter belt pulley, a retainer wall running along said one side of the main belt, means forming a gate in said retainer wall to provide access to said feed rolls for articles urged across the main belt by said diverter belt, a take away conveyor for receiving articles from said feed pulleys, and means for driving said main and diverter belts and said feed rolls.

3. The system of claim 2, wherein said feed rolls have a higher peripheral speed than the linear speed of said diverter belt.

4. The system of claim 3 wherein said diverter belt pulley and said feed rolls are on the same shaft, with said diverter belt pulley being loose on said shaft, said feed rolls being keyed to the shaft, and means to drive the shaft.

5. The system of claim 3, wherein said feed rolls are longitudinally ribbed.

6. The system of claim 2, wherein the retainer wall has an adjustable gate member for varying the width of said gate.

7. The system of claim 6, wherein the adjustable gate member is upstream of said diverter belt.

* * * * *